(12) United States Patent
Mohr

(10) Patent No.: US 9,031,582 B2
(45) Date of Patent: May 12, 2015

(54) DISABLING OF WIRELESS TRANSMISSION OF WIRELESS COMMUNICATION DEVICES USING MESSAGES

(71) Applicant: Intel Corporation, Santa Clara, CA (US)

(72) Inventor: John Mohr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/710,982

(22) Filed: Dec. 11, 2012

(65) Prior Publication Data

US 2014/0162618 A1    Jun. 12, 2014

(51) Int. Cl.
H04W 24/00 (2009.01)
H04W 48/02 (2009.01)
H04W 8/20 (2009.01)

(52) U.S. Cl.
CPC .............. H04W 48/02 (2013.01); H04W 8/20 (2013.01)

(58) Field of Classification Search
CPC ...... H04W 84/06; H04W 84/02; H04W 12/00
USPC .......... 455/431, 421, 456.1, 456.4, 457, 41.2, 455/418–420, 410–411, 466, 550.1, 567; 340/10.5
See application file for complete search history.

(56) References Cited

U.S. PATENT DOCUMENTS

| | | | |
|---|---|---|---|
| 6,594,354 B1 * | 7/2003 | Kelly | 379/201.1 |
| 7,193,965 B1 | 3/2007 | Nevo et al. | |
| 7,395,055 B2 * | 7/2008 | Chitrapu et al. | 455/420 |
| 7,593,728 B2 * | 9/2009 | Lee et al. | 455/435.1 |
| 8,073,438 B2 * | 12/2011 | McNally | 455/419 |
| 8,126,445 B2 * | 2/2012 | Kennedy | 455/418 |
| 8,311,581 B2 * | 11/2012 | Nasr | 455/557 |
| 8,346,248 B2 * | 1/2013 | Howarter et al. | 455/431 |
| 8,725,113 B2 * | 5/2014 | Gargi et al. | 455/411 |
| 2003/0008644 A1 * | 1/2003 | Akhterzzaman et al. | 455/418 |
| 2010/0035588 A1 * | 2/2010 | Adler et al. | 455/414.1 |
| 2010/0167716 A1 * | 7/2010 | Howarter et al. | 455/419 |

(Continued)

OTHER PUBLICATIONS

International Search Report and Written Opinion, mail date Oct. 1, 2013, PCT/ISA/210, PCT/ISA/220, and PCT/ISA/237, total of 9 pages.
L. van Hoesel et al., "A Lightweight Medium Access Protocol (LMAC) for Wireless Sensor Networks: Reducing Preamble Transmissions and Transceiver State Switches", International Conference on Networked Sensing Systems, 2004, total of 4 pages.

Primary Examiner — Sharad Rampuria
(74) Attorney, Agent, or Firm — Pillsbury Winthrop Shaw Pittman LLP

(57) ABSTRACT

Systems, methods, and apparatuses are directed to facilitating disabling of wireless transmission of wireless communication devices using messages. In one embodiment, logic is configured to generate a disabling message that indicates disabling of wireless transmission, and wirelessly transmit the disabling message to cause disabling of a transmitter portion of a wireless transceiver of a wireless communication device that receives the disabling message. In another embodiment, logic is configured to generate a disabling message that indicates disabling of wireless transmission, and wirelessly transmit the disabling message to cause disabling of a transmitter portion of a wireless transceiver of a wireless communication device that receives the disabling message. In some embodiments, the disabling message may cause the transmitter portion of the wireless transceiver to be disabled while a receiver portion of the wireless transmitter remains enabled.

15 Claims, 6 Drawing Sheets

(56) References Cited

U.S. PATENT DOCUMENTS

| | | | |
|---|---|---|---|
| 2010/0210254 A1* | 8/2010 | Kelly et al. | 455/418 |
| 2010/0234047 A1* | 9/2010 | Lipovski | 455/456.4 |
| 2010/0267375 A1* | 10/2010 | Lemmon et al. | 455/418 |
| 2011/0021234 A1* | 1/2011 | Tibbitts et al. | 455/517 |
| 2013/0052945 A1* | 2/2013 | Ewell et al. | 455/26.1 |
| 2013/0122883 A1* | 5/2013 | Jung et al. | 455/418 |
| 2013/0214909 A1* | 8/2013 | Meijers et al. | 340/10.5 |
| 2014/0006347 A1* | 1/2014 | Qureshi et al. | 707/621 |

* cited by examiner

US 9,031,582 B2

DISABLING OF WIRELESS TRANSMISSION OF WIRELESS COMMUNICATION DEVICES USING MESSAGES

TECHNICAL FIELD

This disclosure relates generally to disabling of one or more functionalities of a communication device using messages, and in particular, to disabling of one or more functionalities of a wireless communication device using messages.

BACKGROUND ART

Typically, users manually disable and enable transmitting/receiving of radio frequency (RF) signals of their wireless communication devices. For example, when a user is in an environment in which wireless interference from his/her communication device may risk the safety of the user or others, the user is generally advised to turn the communication device off or to change the mode of the communication device to "Airplane Mode" (e.g., wireless transmission and reception of the communication device is disabled). However, the user may nonetheless still forget to follow such procedures, resulting in the increased risk of danger to the user as well as others. These and other drawbacks exist with typical approaches of disabling and enabling wireless signals of wireless communication devices.

DETAILED DESCRIPTION

Figure 1:
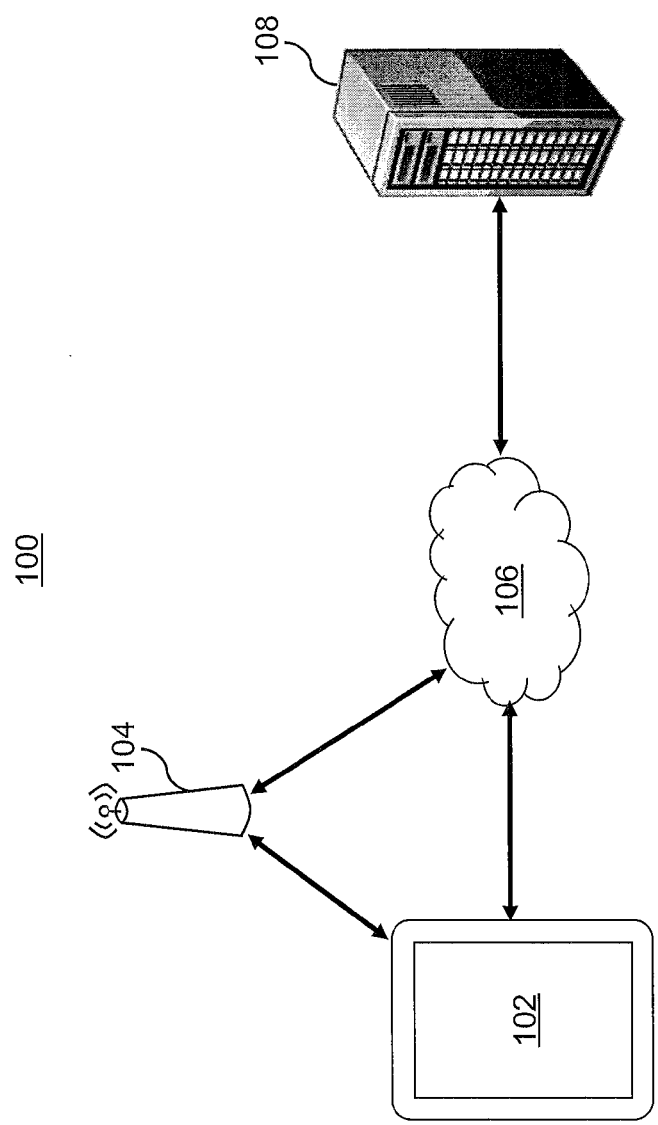
FIG. 1 depicts a high-level functional block diagram of a system for facilitating disabling of wireless transmission of wireless communication devices using messages, in accordance with various aspects of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, devices, systems, and/or methods for facilitating disabling of wireless transmission of wireless communication devices using messages are proposed. In one embodiment, an electronic device for facilitating disabling of wireless transmission of wireless communication devices using messages may include a memory unit, and logic configured to: generate a disabling message that indicates disabling of wireless transmission, and wirelessly transmit the disabling message to cause disabling of a transmitter portion of a wireless transceiver of a wireless communication device that receives the disabling message.

In another embodiment, a system for facilitating disabling of wireless transmission of wireless communication devices using messages may include a wireless communication device and an electronic device that includes a memory unit and logic configured to: generate a disabling message that indicates disabling of wireless transmission, and wirelessly transmit the disabling message to cause disabling of a transmitter portion of a wireless transceiver of a wireless communication device that receives the disabling message.

In another embodiment, a method for facilitating disabling of wireless transmission of wireless communication devices using messages may include generating a disabling message that indicates disabling of wireless transmission, and wirelessly transmitting the disabling message to cause disabling of a transmitter portion of a wireless transceiver of a wireless communication device that receives the disabling message.

In another embodiment, a wireless communication device for facilitating disabling of wireless transmission of wireless communication devices using messages may include a memory unit, a wireless transceiver configured to transmit and receive wireless signals, and logic configured to: wirelessly receive a disabling message that indicates disabling of wireless transmission; and disable a transmitter portion of the wireless transceiver based on the disabling message.

In another embodiment, a system for facilitating disabling of wireless transmission of wireless communication devices using messages may include an electronic device and a wireless communication device that includes a memory unit, a wireless transceiver, and logic configured to: wirelessly receive a disabling message that indicates disabling of wireless transmission; and disable a transmitter portion of the wireless transceiver based on the disabling message.

In another embodiment, a method for facilitating disabling of wireless transmission of wireless communication devices using messages may include wirelessly receiving a disabling message that indicates disabling of wireless transmission, and disabling a transmitter portion of the wireless transceiver based on the disabling message.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a," "an," and "the" include plural referents unless the context clearly dictates otherwise.

FIG. 1 depicts a high-level functional block diagram of a system 100 for facilitating disabling of wireless transmission of wireless communication devices using messages, in accordance with various aspects of the present disclosure. As illustrated, system 100 includes wireless communication device 102 and electronic device 104 that is configured to transmit disabling messages that indicates disabling of wireless transmission. It should be noted that wireless communication device 102 and/or electronic device 104 may represent any of a number of electronic and/or computing devices, both wireless and wired. As such, in some embodiments, wireless communication device 102 and/or electronic device 104 may comprise desktops, laptops, mobile devices, smart phones, gaming devices, tablet computers, and/or other devices.

Wireless communication device 102, electronic device 104, and/or other devices may communicate over communication network 106, for instance, to interact with a third party provider server 108 or to perform other functions. It should be noted that the communication mechanisms and networks as described herein are not intended to be limiting in any way, as the communications could be based on one or more standards and protocols including, but not limited to, Ethernet, Wi-Fi, Bluetooth, NFC, radio frequency, GSM, CDMA, GPRS, 3G or 4G (e.g., WiMAX, LTE, etc.) cellular standards, Wireless USB, satellite communication, infrared, sonar, etc., and communication network 106 may comprise the Internet or any other suitable network, such as peer-to-peer, intranets, extranets, etc.

In one embodiment, with respect to FIG. 1, electronic device 104 may generate a disabling message that indicates disabling of wireless transmission and then wirelessly transmit the disabling message to cause disabling of a transmitter portion of a wireless transceiver of a wireless communication device that receives the disabling message. By way of illustration, wireless communication device 102 may wirelessly receive the disabling message directly from electronic device 104. In response to receiving the disabling message, wireless communication device 102 may process the disabling message and, based on the processing, determine that the disabling message specifies disabling of wireless transmission. As such, wireless communication device 102 may disable a transmitter portion of its wireless transceiver. In some embodiments, based on receipt of the disabling message, wireless communication device 102 may disable the transmitter portion and a receiver portion of its wireless transceiver. In this way, wireless transmission and/or reception of wireless communication device 102 may be disabled without a user of wireless communication device 102 having to manually initiate the disabling of the wireless transmission and/or reception or while reducing the amount of manual input by the user to disable the wireless transmission and/or reception.

In some embodiments, the disabling message that is transmitted wirelessly by electronic device 104 may cause disabling of a transmitter portion of a wireless transceiver of a wireless communication device that receives the disabling message while a receiver portion of the wireless transceiver remains enabled. In one embodiment, wireless communication device 102 may be configured such that, based on wireless communication device 102 receiving the disabling message and determining that the disabling message indicates disabling of wireless transmission, wireless communication device 102 may disable the transmitter portion of its wireless transceiver while leaving a receiver portion of its wireless transceiver enabled. In another embodiment, the disabling message may indicate the disabling of wireless transmission without disabling of wireless reception. As such, upon processing of the disabling message, wireless communication device 102 may determine that the disabling message is requesting that the transmitter portion of its wireless receiver be disabled and that the receiver portion of its wireless transceiver remain enabled. Thus, as requested, wireless communication device 102 may disable the transmitter portion of its wireless transceiver while leaving a receiver portion of its wireless transceiver enabled.

Figure 2:
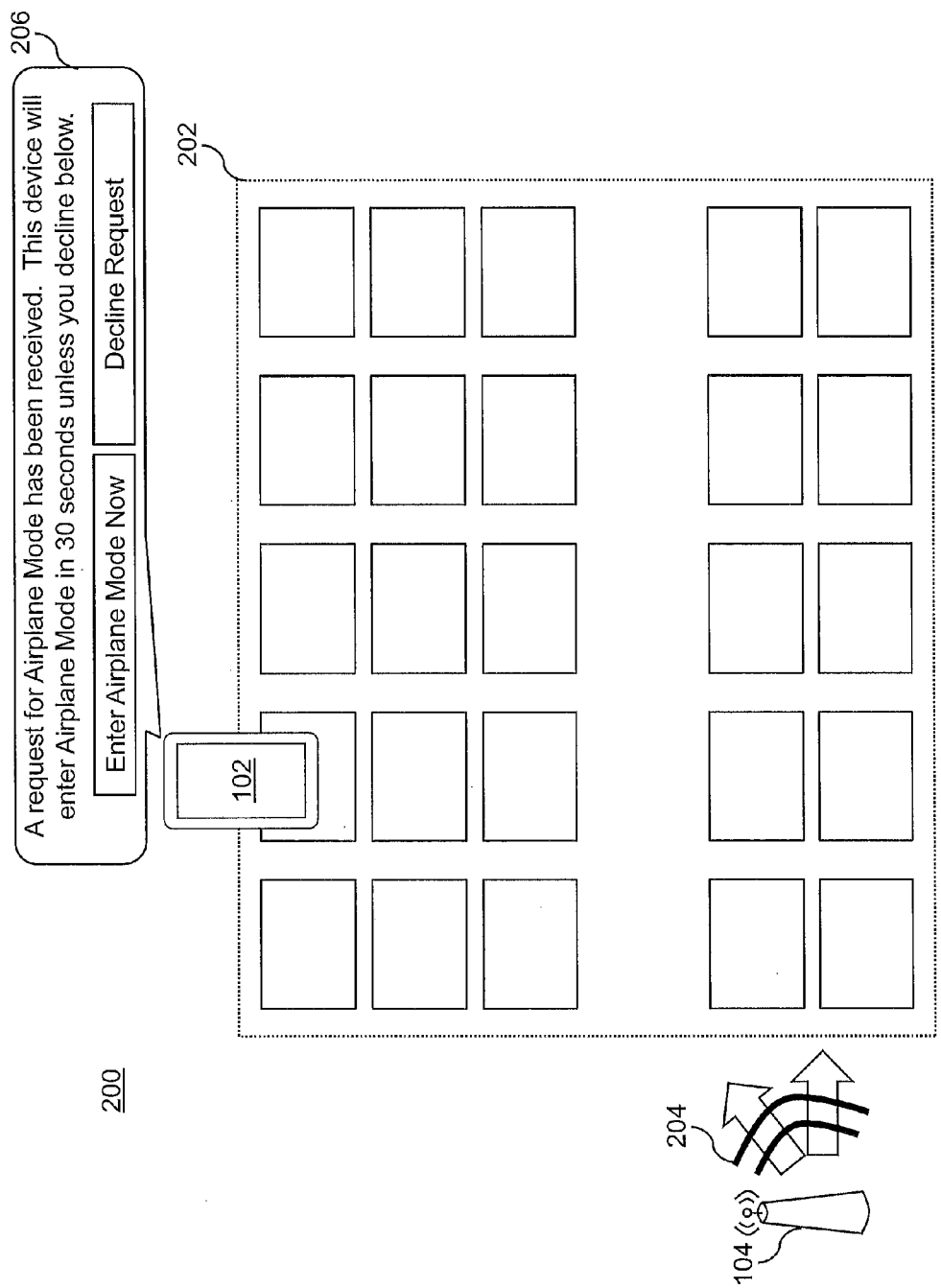
FIG. 2 depicts a scenario illustrating disabling of wireless transmission of wireless communication devices using messages, in accordance with various aspects of the present disclosure.

Along these lines, FIG. 2 depicts scenario 200 illustrating disabling of wireless transmission of wireless communication devices using messages, in accordance with various aspects of the present disclosure. Scenario 200 may, for instance, take place inside of an airplane prior to take off. As such, in addition to reminding customers to turn off their wireless communication devices 102, the flight crew may input a request, via electronic device 104, to disable wireless transmission and/or reception of wireless communication devices 102 in the customer seating area 202 to reduce the amount of interference with wireless communication of the airplane that may be caused by wireless transmission and/or reception of wireless communication devices 102 in seating area 202 (e.g., when customers nonetheless still forget to turn off their wireless communication devices 102, when customers are reluctant to turn off their wireless communication devices 102, etc.).

Based on the inputted request, electronic device 104 may generate message 204 configured to indicate disabling of wireless transmission and/or reception in accordance with one or more predetermined rules. In one use case, the predetermined rules may include standards created to indicate the disabling of wireless transmission and/or reception in a message such that communication devices compatible with the standards that receive the message may initiate one or more actions to disable transmitter and/or receiver portions of their respective wireless transceivers. As indicated, message 204 may be configured to indicate the disabling of wireless transmission without disabling of wireless reception. Upon generation of message 204, electronic device 104 may wirelessly transmit message 204 to cause wireless communication devices 102 in seating area 202 to: (1) disable transmitter and receiver portions of their wireless transceivers; or (2) disable transmitter portions of their wireless transceivers while leaving the receiver portions of their wireless transceivers enabled. Such actions by wireless communication device 102 may, for instance, be based on message 204 indicating: (1) disabling of both wireless transmission and reception; or (2) disabling of wireless transmission without disabling of wireless reception.

Figure 3:
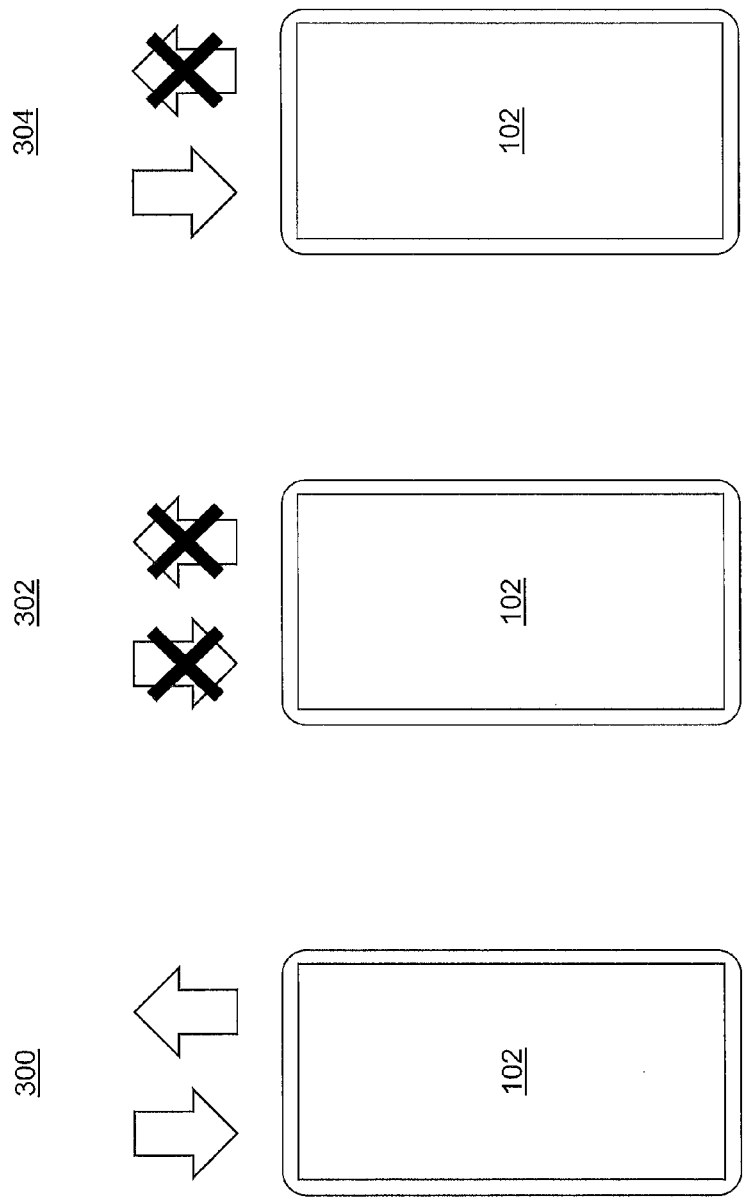
FIG. 3 depicts wireless communication modes of a wireless communication device, in accordance with various aspects of the present disclosure.

Turning to FIG. 3, the illustrated embodiment depicts wireless communication modes 300, 302, and 304 of a wireless communication device, in accordance with various aspects of the present disclosure. In one use case, prior to receiving message 204, wireless communication device 102 may be in wireless communication mode 300 (e.g., "Normal Mode") which allows wireless communication device 102 to wirelessly transmit and receive messages. As an example, upon receiving message 204, wireless communication device 102 may transition from wireless communication mode 300 to wireless communication mode 302 (e.g., "Airplane Mode") which prevents wireless communication device 102 from wirelessly transmitting or receiving messages. As another example, upon receiving message 204, wireless communication device 102 may transition from wireless communication mode 300 to wireless communication mode 304 (e.g., "Hybrid Mode") which prevents wireless communication device 102 from wirelessly transmitting messages, but allows wireless communication device 102 to wirelessly receive messages. Wireless communication mode 304 may, for instance, be beneficial to enable wireless communication device 102 to receive critical information, such as emergency messages, weather/disaster advisories, amber alerts, etc. In addition, wireless communication mode 304 may be implemented to allow wireless communication device 102 to be wirelessly enabled via wireless receipt of an enabling message that indicates enabling of wireless transmission.

Thus, in some embodiments, as noted in FIG. 1, electronic device 104 may generate the enabling message that indicate the enabling of wireless transmission and then wirelessly transmit the enabling message to cause enabling of the wireless transceiver of one or more communication devices that receive the enabling message. Wireless communication device 102 may, for instance, wirelessly receive the enabling message directly from electronic device 104. In response to receiving the enabling message, wireless communication device 102 may process the enabling message and, based on the processing, determine that the enabling message specifies enabling of wireless transmission. As such, wireless communication device 102 may enable the transmitter portion of its wireless transceiver. In some embodiments, both transmitter and receiver portions of the wireless transceiver of communication device may be disabled. Nonetheless, upon receipt of the enabling message (e.g., via wireline), wireless communication device 102 may enable the transmitter and receiver portions of its wireless transceiver.

Moreover, with respect to the airplane scenario of FIG. 2, disabling of wireless transmission and/or reception of wireless communication devices using messages may facilitate increased safety of flights and/or other benefits, for instance, by reducing the amount of interference caused by wireless transmission from wireless communication devices. It should be noted that disabling of wireless transmission and/or reception of wireless communication devices may increase safety, decrease noisy interruptions, and/or provide other benefits in other scenarios, such as in hospitals where wireless signal interference may negatively affect medical devices, in classrooms where phone calls or other communications may negatively impact a learning environment, etc.

Again, returning to FIG. 1, the disabling message may be configured to cause disabling of wireless transmission for a predetermined time period. In one embodiment, the disabling message may be wirelessly transmitted on a periodic basis that corresponds to the predetermined time period to cause the transmitter portion of the wireless transceiver of wireless communication device 102 to be disabled for longer than the predetermined period. Thus, in another embodiment, the transmitter portion of the wireless transceiver of wireless communication device 102 may be disabled for longer than the predetermined time period based on wireless communication device 102 receiving the disabling message on the periodic basis. By way of example, wireless communication device 102 may disable the transmitter portion of its wireless transceiver for two minutes each time that the disabling message is received. The two-minute time period may, for instance, be in accordance with one or more predetermines rules (e.g., standards) that specify the amount of time a device function is to be disabled for each disabling message received. As such, electronic device 104 may be configured to transmit the disabling message about every two minutes or less to prevent (or at least minimize) wireless transmission from wireless communication devices 102.

In one use case, electronic device 104 may be utilized to wirelessly broadcast the disabling message in a testing room to mitigate cheating during tests, for instance, by preventing users from wirelessly transmitting and/or receiving messages via their wireless communication devices 102. For example, wireless communication devices 102 of users who are still in the testing room may continue to receive the disabling message periodically (e.g., about every two minutes or less), causing the transmitter and/or receiver portions of the wireless transceivers of those wireless communication devices 102 to remain disabled. However, upon those users leaving the testing room, the transmitter and/or receiver portions of the wireless transceivers of their wireless communication devices 102 may become and remain enabled after the predetermined time period has passed and their wireless communication devices 102 are no longer receiving the disabling message.

In some embodiments, the transmitter portion of the wireless transceiver of wireless communication device 102 may be disabled based on wireless communication device 102 being within a threshold proximity to electronic device 104 (e.g., which wirelessly transmitted the disabling message). As an example, a given electronic device 104 may be configured to wireless broadcast disabling messages up to ten meters away such that, when a given wireless communication device 102 comes within ten meters away, the given wireless communication device 102 may disable the transmitter and/or receiver portions of its wireless transceiver. As another example, a given wireless communication device 102 may include a near-field communication (NFC) reader. To disable wireless transmission and/or reception of the wireless communication device 102, a user may place the wireless communication device 102 within the threshold proximity of a NFC tag (e.g., within four centimeters) that is configured to wirelessly transmit the disabling message indicating disabling of wireless transmission upon activation by the NFC reader of the wireless communication device 102. In one use case, the NFC tag may be placed at an entrance point of a particular section of a hospital and successful scanning of the NFC tag by wireless communication devices 102 may be required to pass the entrance point, for instance, to reduce the amount of wireless interference from wireless communication devices 102 in that section of the hospital. In other scenarios, an RF reader (e.g., RFID reader) may be utilized in lieu of an NFC reader, and an RF tag (e.g., RFID tag) may be utilized in lieu of an NFC tag.

Figure 4:
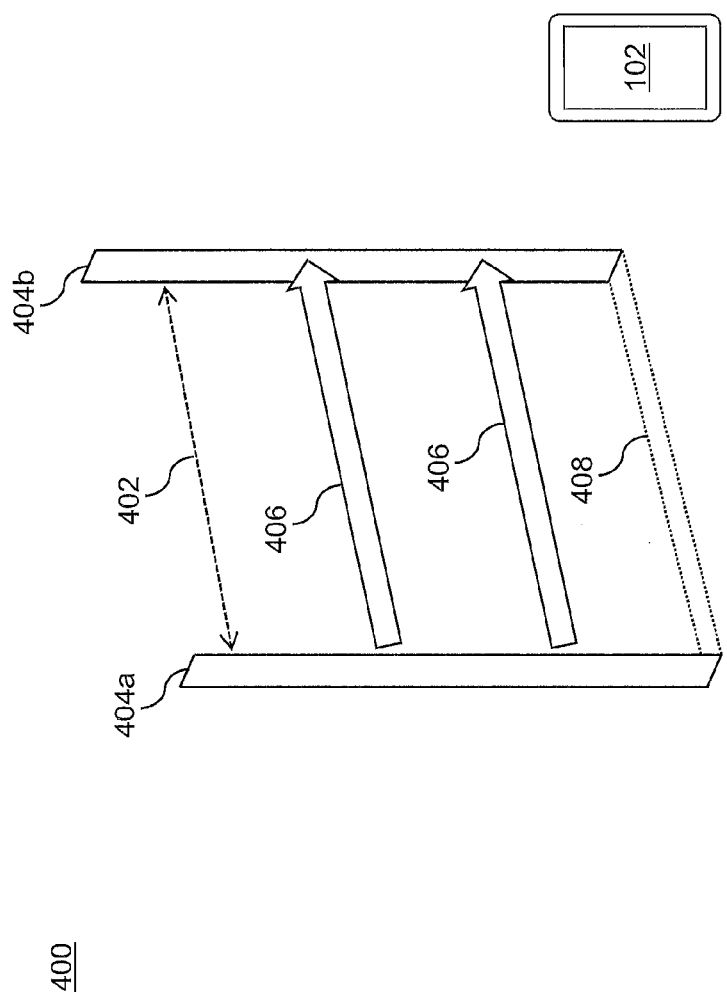
FIG. 4 depicts a scenario illustrating unidirectional transmission of disabling messages, in accordance with various aspects of the present disclosure.

As yet another example, FIG. 4 depicts scenario 400 illustrating unidirectional transmission of disabling messages, in accordance with various aspects of the present disclosure. In one use case, the threshold proximity may be set based on the distance 402 between two structures 404a and 404b (e.g., distance 402 may be the threshold proximity). As indicated by scenario 400, signals may be wirelessly transmitted via unidirectional broadcast (e.g., indicators 406) from structure 404a to structure 404b. Structures 404a may, for instance, include electronic device 104 configured to wirelessly transmit the disabling message via the unidirectional signals, and structure 404b may be a structure at which the unidirectional signals end (e.g., stopped, absorbed, etc.). Scenario 400 may, for instance, be illustrative of an environment that disables wireless transmission and/or reception of wireless communication devices 102 upon entering the environment through structures 404a and 404b. For example, in order to enter such an environment, users may be required to walk through line 408. However, when users cross line 408, their wireless communication devices 102 may receive the disabling message, resulting in transmitter or receiver portions of the wireless transceiver of those wireless communication devices 102 being disabled. In this way, even if users forget to turn off their wireless communication devices 102 or otherwise disable wireless transmission/reception of their communication devices before entering such an environment, the act of entering the environment may nonetheless result in the disabling of the wireless transmission/reception of those wireless communication devices 102.

In some embodiments, the disabling message may include pseudo-authentication information, and the transmitter portion of the wireless transceiver of wireless communication device 102 may be disabled based on the pseudo-authentication information. As an example, the pseudo-authentication information may include identification, authorization information, a one-time password (OTP), and/or other pseudo-authentication information. In one embodiment, electronic device 104 may transmit a request for the pseudo-authentication information to a third party (e.g., via third party provider server 108). In response, electronic device 104 may receive, from the third party, the pseudo-authentication information that is included in the disabling message, which is wirelessly transmitted to cause disabling of wireless transmission of wireless communication devices 102 that receive the disabling message. In another embodiment, wireless communication device 102 may be registered with a third party, and the transmitter portion of the wireless transceiver of wireless communication device 102 may be disabled based on the registration of wireless communication device 102 with the third party.

In one use case, electronic device 104 may be configured to interact with a service provider Cell Provider X that provides cellular services (e.g., access to cellular voice network, access to cellular data network, and/or other services). As part of its cellular services to its registered users, Cell Provider X may provide automatic disablement of wireless transmission and/or reception at airlines, hospitals, courtrooms, or other environments in which wireless transmission/reception are to be disabled. Electronic device 104 may, for instance, periodically communicate with Cell Provider X to obtain an OTP from Cell Provider X that will remain valid for a predetermined time period. During generation of the disabling message, electronic device 104 may include the OTP in the disabling message. Electronic device may then wirelessly transmit the disabling message with the OTP to cause disabling of wireless transmission and/or reception of wireless communication devices 102 that receive the disabling message. Thus, when a given wireless communication device 102 receives and processes the disabling message, the wireless communication device 102 may verify the OTP with Cell Provider X. If, for instance, Cell Provider X confirms the validity of the OTP, the wireless communication device 102 may then disable its wireless transmission and/or reception (e.g., by disabling transmitter and/or receiver portions of its wireless transceiver).

In some embodiments, wireless communication device 102 may initiate, based on the disabling message, presentation of a notification message that requests confirmation from a user of wireless communication device 102 for the transmitter portion of the wireless transceiver to be disabled. In one embodiment, wireless communication device 102 may present one or more indicators, such as an audio alert, a flashing indicator light, a blinking display, a haptic alert, etc., to inform the user of that the disabling message has been received. Based on one or more of the confirmation from the user or a failure of the user to indicate a denial of the disabling of the transmitter portion of the wireless transceiver within a predetermined denial period, wireless communication device 102 may disable the transmitter portion of its wireless transceiver. For example, as shown in FIG. 2, the user of wireless communication device 102 may be presented with notification 206 upon receipt of the disabling message from electronic device 104. Notification 206 indicates to the user that a request to disable transmitter and receiver portions of the wireless transceiver of wireless communication device 102 (e.g., by placing wireless communication device 102 in "Airplane Mode") has been received, and that such portions of the wireless transceiver will be disabled in 30 seconds unless the user declines using the "Decline Request" button. As depicted, the user may also immediately disable the transmitter and receiver portions of the wireless transceiver by selecting the "Enter Airplane Mode Now" button. In this way, notification 206 may, for instance, be provided to facilitate prevention of unauthorized disablement of device functions (e.g., by notifying the user of disablement requests, allowing users to decline such requests, etc.), offer users an option to decline disablement of device functions (e.g., even those that may have been preauthorized), and/or provide other benefits.

It should be noted that while some embodiments describe wireless transmission and/or wireless receipt of the disabling/enabling messages, it is contemplated that the disabling/enabling messages may be transmitted by an electronic device (e.g., electronic device 104) via a wireline and that the disabling/enabling message may be received by a communication device (e.g., wireless communication device 102) via a wireline. It should also be noted that while some embodiments describe disabling of wireless transmission, it is contemplated that aspects of the disclosure may be applied to disabling of wireless reception. For example, a disabling message that indicates disabling of wireless reception may be generated at electronic device 104 and transmitted (e.g., via wired or wireless techniques) to cause disabling of a receiver portion of a wireless transceiver of a communication device (e.g., wireless communication device 102) that receives the disabling message. In one embodiment, wireless communication device 102 may, for instance, be configured such that, based on wireless communication device 102 receiving the disabling message and determining that the disabling message indicates the disabling of wireless reception, wireless communication device 102 may disable a receiver portion of its wireless transceiver while leaving a transmitter portion of its wireless transceiver enabled. In another embodiment, the disabling message may indicate the disabling of wireless reception without disabling of wireless transmission. As such, based on wireless communication device 102 receiving the disabling message and determine that the disabling message indicates the disabling of wireless reception, wireless communication device 102 may disable the receiver portion of its wireless transceiver while leaving the transmitter portion of its wireless transceiver enabled.

It should also be noted that while some embodiments are with respect to disabling wireless transmission and/or reception, it is contemplated that aspects of the disclosure may be applied to disabling of other device functions. For example, a disabling message that indicates disabling of audio, visual, haptic, and/or other senses-related functions may be generated at electronic device 104 and transmitted (e.g., via wired or wireless techniques) to cause disabling of those functions of a communication device that receives the disabling message. In one embodiment, wireless communication device 102 may, for instance, be configured such that, based on communication device receiving the disabling message and determining that the disabling message indicates the disabling of one or more senses-related functions, wireless communication device 102 may disable the one or more senses-related functions and: (1) leave one or more other senses-related functions enabled or (2) enable the one or more other senses-related functions. In another embodiment, the disabling message may indicate the disabling of the one or more senses-related functions and indicate: (1) non-disabling of the one or more other senses-related functions or (2) enabling of the one or more other senses-related functions. By way of example, electronic device 104 may generate a disabling message that indicates disabling of audio alerts (e.g., audio ringing to indicate a phone call, an audio beep to indicate a text message, a bell sound to indicate a reminder, etc.) such that, when wirelessly transmitted by electronic device 104 and wirelessly received by wireless communication device 102, wireless communication device 102 places itself in silent mode, vibrate mode (e.g., by enabling haptic alerts), and/or other alert modes.

It should also be noted that while some embodiments are with respect to disabling device functions, it is contemplated that aspects of the disclosure may be applied to modification of device functions. For example, a disabling message may indicate modification of device functions. In one use case, for instance, a disabling message may indicate decreasing or increasing the volume of audio alerts, such that a communication device that receives the disabling message may decrease or increase the volume of its audio alerts.

Figure 5:
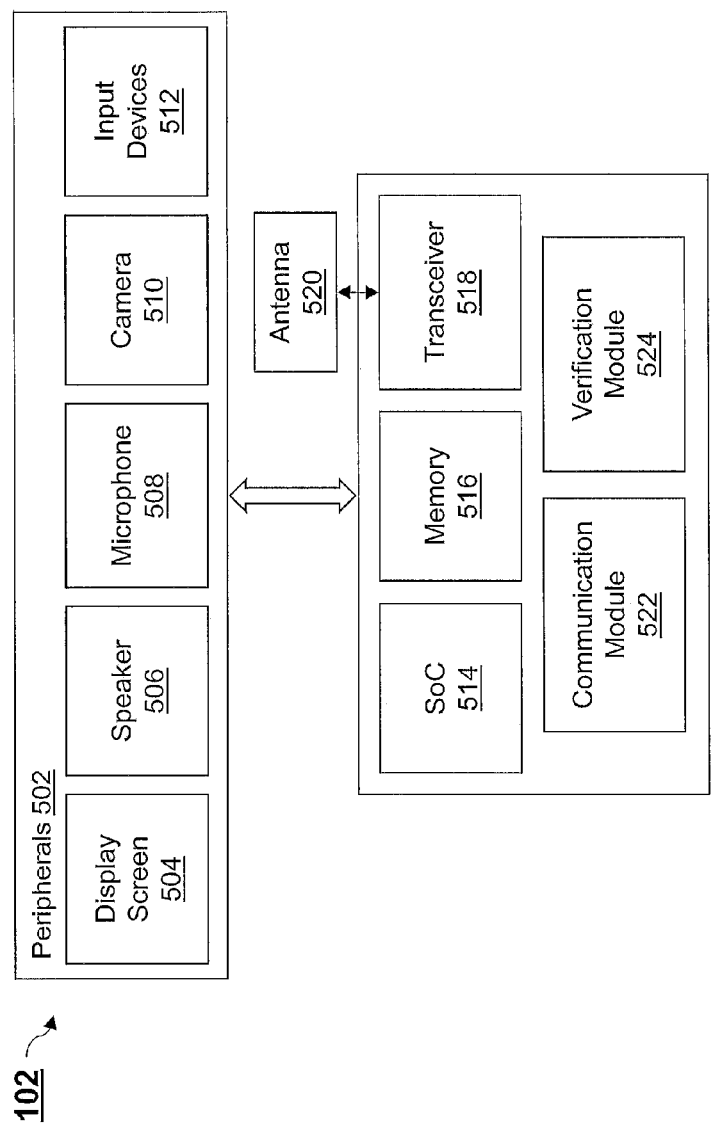
FIG. 5 depicts a high-level functional block diagram of a wireless communication device, in accordance with various aspects of the present disclosure.

FIG. 5 illustrates a high-level functional block diagram of wireless communication device 102, in accordance with various aspects of the present disclosure. In the illustrative example, wireless communication device 102 includes a variety of peripheral components 502, such as, for example, display screen 504, speaker 506, microphone 508, camera 510, input devices 512, as well as a system-on-a-chip (SoC) 514, memory 516, a transceiver 518 (e.g., wireless transceiver), an antenna 520 (e.g., RF antenna), a communication module 522, a verification module 524, and/or other components. Wireless communication device 102 may also include a bus infrastructure and/or other interconnection means to connect and communicate information between various components of wireless communication device 102.

In some embodiments, SoC 514 may be part of a core processing or computing unit of wireless communication device 102, and is configured to receive and process input data and instructions, provide output and/or control other components of wireless communication device 102 in accordance with embodiments of the present disclosure. SoC 514 may include a microprocessor, a memory controller, a memory and other components. The microprocessor may further include a cache memory (e.g., SRAM), which along with the memory of SoC 514 may be part of a memory hierarchy to store instructions and data. The microprocessor may also include one or more logic modules such as a field programmable gate array (FPGA) or other logic array. Communication between the SoC 514's microprocessor and memory may be facilitated by the memory controller (or chipset), which may also facilitate communication with peripheral components 502.

Memory 516 may be a dynamic storage device coupled to the bus infrastructure and configured to store information, instructions, and programs (e.g., such as applications integrated with software modules of wireless communication device 102) to be executed by processors of SoC 514 and/or other processors (or controllers) associated with wireless communication device 102. Some of all of memory 516 may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. Wireless communication device 102 may also include read only memory (ROM) and/or other static storage devices coupled to the bus infrastructure and configured to store static information and instructions for processors of SoC 514 and/or other processors (or controllers) associated with wireless communication device 102.

Transceiver 518 may be configured to transmit and receive signals. For example, transceiver 518 may be a wireless transceiver that includes a transmitter and a receiver for transmitting and receiving wireless signals (e.g., via antenna 520). The transmitter and the receiver may, for instance, be combined and share common circuitry or a single housing. Communication module 522 may utilize the transceiver to transmit and receive communication (e.g., messages). Moreover, communication module 522 may perform initially processing of messages to determine where the messages are to be forwarded and/or how those messages should be further processed. For example, upon determining that a received message is a disabling message that indicates disabling of wireless transmission/reception, communication module 522 may forward the disabling message to verification module 524 to verify pseudo-authentication information that may be included with the disabling message, to receive a confirmation from a user to disable wireless transmission/reception of wireless communication device 102, etc. If, for instance, verification module 524 verifies that the pseudo-authentication information valid, receives confirmation from the user, etc., communication module 522 may disable the transmitter and/or the receiver of transceiver 518.

It should be noted that, in some embodiments, electronic device 104 may include components that are the same as or similar to components of wireless communication device 102 as shown in FIG. 5, as well as one or more other components, to facilitate disabling of wireless transmission of wireless communication devices using messages. By way of example, electronic device 104 may include a wireless transceiver that includes a transmitter and a receiver for transmitting and receiving wireless signals, along with a communication module that utilizes the transmitter of the wireless transceiver to wireless transmit a disabling message to cause disabling of transmitter and/or receiver portions of wireless communication devices 102 that receive the disabling message. As another example, electronic device 104 may include a pseudo-authentication module for requesting and obtaining pseudo-authentication information from a third party (e.g., a cellular service provider for wireless communication devices 102). Electronic device 104 may also include a disabler/enabler module for generating disabling/enabling messages and including the pseudo-authentication information in such messages.

Figure 6:
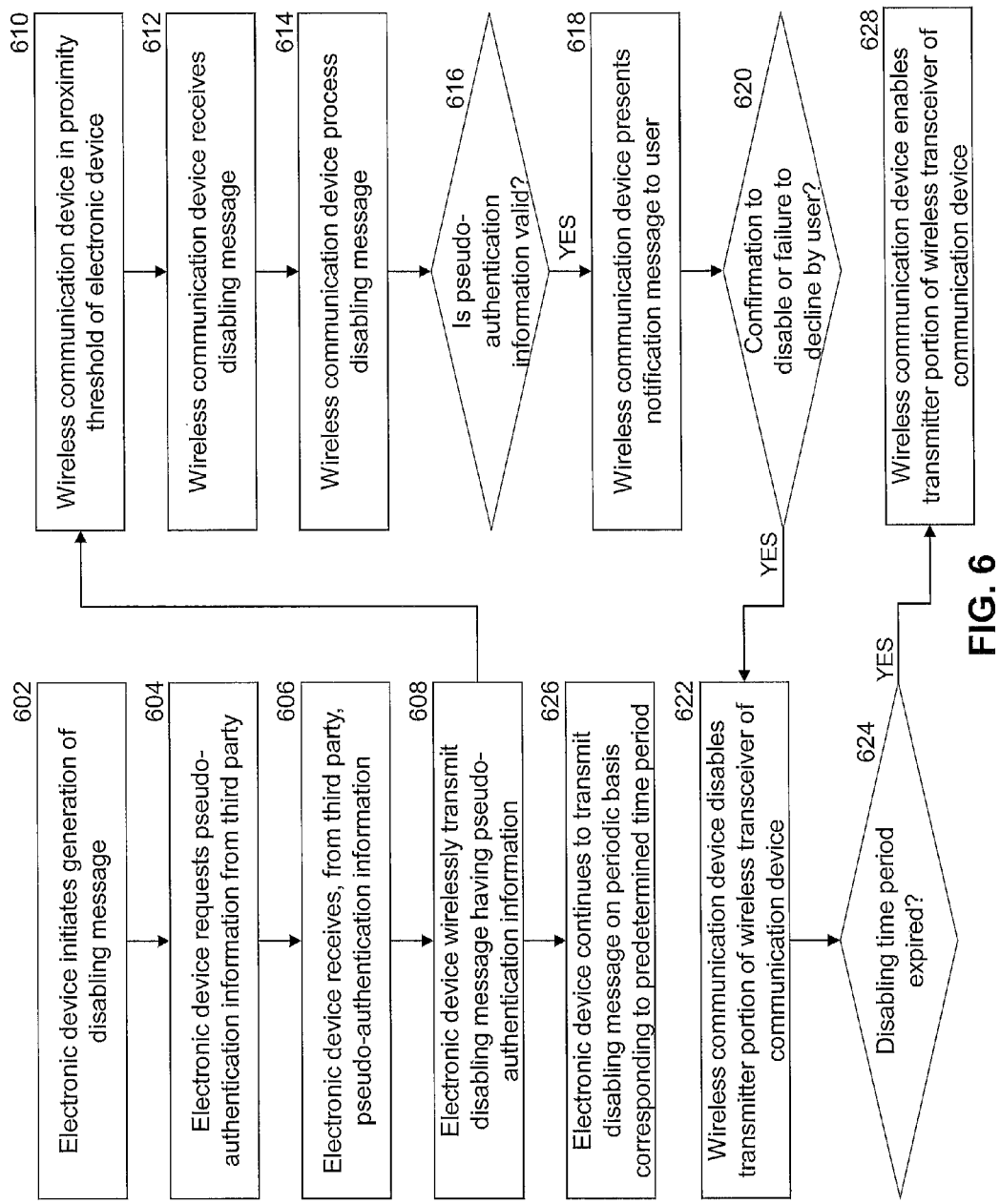
FIG. 6 depicts a high-level flow diagram of a process for facilitating disabling of wireless transmission of wireless communication devices using messages, in accordance with various aspects of the present disclosure.

FIG. 6 depicts a high-level flow diagram of a process for facilitating disabling of wireless transmission of wireless communication devices using messages, in accordance with various aspects of the present disclosure. It should be noted that the process of FIG. 6 is intended to be illustrative. In some embodiments, the process of FIG. 6 may be occur with one or more additional blocks not described, and/or without one or more of the blocks discussed. Additionally, the order with respect to the process that is illustrated in FIG. 5 and described below is not intended to be limiting. With such understanding in mind, in block 602, electronic device 104 initiates generation of a disabling message that indicates disabling of wireless transmission. During the generation of the disabling message, electronic device 104 requests pseudo-authentication information from a third party, as indicated in block 604. As noted above, the third party may be a service provider associated with one or more wireless communication devices 102. As an example, the third party may provide cellular network access to users of those wireless communication devices 102 that are registered with the third party. The pseudo-authentication information may include identification, authorization information, an OTP, and/or other pseudo-authentication information.

In block 606, electronic device 104 receives the pseudo-authentication information from the third party. Electronic device 104 may then include the pseudo-authentication information in the disabling message, and wirelessly transmit the disabling message, as indicated in block 608. For example, electronic device 104 may wirelessly broadcast the disabling message to cause disabling of transmitter portions of wireless transceivers of wireless communication devices 102 that receive the disabling message.

In block 610, a given wireless communication device 102 is within a proximity threshold of electronic device 104 that enables the wireless communication device 102 to receive the disabling message, as indicated in blocks 610 and 612. Upon receipt, in block 614, the wireless communication device 102 processes the disabling message and determines that the disabling message specifies the disabling of wireless transmission. The wireless communication device 102 may then, in block 616, check the disabling message for the pseudo-authentication information and determine whether the pseudo-authentication information is valid. For example, the wireless communication device 102 may verify the pseudo-authentication information with a corresponding third party (e.g., the corresponding third party may be the third party that the pseudo-authentication information was initially obtained from by electronic device 104). Upon a confirmation by the third party that the pseudo-authentication information is valid, the process may proceed to block 618. Otherwise, the disabling message may be ignored.

In block 618, the wireless communication device 102 presents a notification message to a user of the wireless communication device 102 that requests confirmation from the user for the transmitter portion of the wireless transceiver to be disabled. In block 620, the wireless communication device 102 determines whether the user confirmed the disabling of the transmitter portion of the wireless transceiver was confirmed or whether the user failed to decline the disablement. If, for instance, the user confirmed the disablement or failed to decline the disablement, the process may proceed to block 622. Otherwise, if the user declined the disablement, the disabling message and future disabling messages from electronic device may be ignored, for instance, for at least a predetermined wait period.

In block 622, the wireless communication device 102 may disable the transmitter portion of the wireless transceiver of the wireless communication device 102. As indicated above, in some embodiments, a disabling message may only cause transmitter portions of the wireless transceivers of wireless communication devices 102 to be disabled for a predetermined period of time. Nonetheless, the transmitter portions of the wireless transceivers may be disabled for longer than the predetermined time period if, for instance, the wireless communication devices 102 continue to receive the disabling message before the predetermined time period expires.

As such, in block 624, the wireless communication device 102 determines whether such predetermined time period has expired. The wireless communication device 102 may, for instance, determine that the predetermined time period has not expired if electronic device 104 continues to transmit the disabling message on a periodic basis corresponding to the predetermined time period (as indicated in block 626) and the wireless communication device 102 remains within the proximity threshold of electronic device 104. However, if the wireless communication device 102 determines that the predetermined time period has expired, the process may proceed to block 628. In block 628, the wireless communication device 102 enables the transmitter portion of the wireless transceiver of the wireless communication device 102, allowing the wireless communication device 102 to transmit wireless signals.

By virtue of the disclosed configurations and processes, with respect to disabling of wireless transmission and/or reception of wireless communication devices, a number of benefits are achieved. Among such benefits, some of which may include increased safety and decreased noisy interruptions, for instance, in hospitals where wireless signal interference may negatively affect medical devices, in classrooms where phone calls or other communications may negatively impact a learning environment, and/or other scenarios.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary aspects of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of method, processing elements, or sequences, or the use of numbers, letters, or other designations therefore, is not intended to limit the claimed processes and methods to any order except as can be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An electronic device, comprising:
a memory unit; and
logic configured to:
generate a disabling message that indicates disabling of wireless transmission, and
wirelessly transmit the disabling message to cause disabling of a transmitter portion of a wireless transceiver of a wireless communication device that receives the disabling message based on the wireless communication device being within a threshold proximity to the electronic device,
wherein the disabling message is configured to cause said disabling for a predetermined time period, and the disabling message is wirelessly transmitted on a periodic basis that corresponds to the predetermined time period to cause the transmitter portion of the wireless transceiver to be disabled for longer than the predetermined time period.

2. The electronic device of claim 1, wherein the disabling message indicates the disabling of wireless transmission without disabling of wireless reception.

3. The electronic device of claim 1, wherein the logic is further configured to:
generate an enabling message that indicates enabling of wireless transmission, and
wirelessly transmit the enabling message to cause enabling of the wireless transceiver of the wireless communication device that receives the enabling message.

4. The electronic device of claim 1, wherein the disabling message includes pseudo-authentication information, and the transmitter portion of the wireless transceiver is disabled based on the pseudo-authentication information.

5. The electronic device of claim 4, wherein the logic is further configured to:
transmit a request for the pseudo-authentication information to a third party; and
receive, from the third party, the pseudo-authentication information that is included in the disabling message.

6. The electronic device of claim 5, wherein the wireless communication device is registered with the third party, and the transmitter portion of the wireless transceiver is disabled based on the registration of the wireless communication device with the third party.

7. A wireless communication device, comprising:
a memory unit;
a wireless transceiver configured to transmit and receive wireless signals; and
logic configured to:
wirelessly receive a disabling message when the wireless communication device is within a threshold proximity of a device that wirelessly transmitted the disabling message, the disabling message indicating disabling of wireless transmission for a predetermined time period, wherein the disabling message is received on a periodic basis that corresponds to the predetermined time period, and
disable a transmitter portion of the wireless transceiver based on the disabling message.

8. The wireless communication device of claim 7, wherein, based on the disabling message, the transmitter portion of the wireless transceiver is disabled while a receiver portion of the wireless transceiver remains enabled.

9. The wireless communication device of claim 8, wherein the disabling message indicates the disabling of wireless transmission without disabling of wireless reception.

10. The wireless communication device of claim 7, wherein the logic is further configured to:
receive an enabling message that indicates enabling of wireless transmission, and
enable the transmitter portion of the wireless transceiver based on the enabling message.

11. The wireless communication device of claim 7, wherein the disabling message includes pseudo-authentication information, and the transmitter portion of the wireless transceiver is disabled based on the pseudo-authentication information.

12. The wireless communication device of claim 7, wherein the wireless communication device is registered with a third party, and the transmitter portion of the wireless transceiver is disabled based on the registration of the wireless communication device with the third party.

13. The wireless communication device of claim 7, wherein the logic is further configured to initiate, based on the disabling message, presentation of a notification message that requests confirmation from a user of the wireless communication device for the transmitter portion of the wireless transceiver to be disabled, and wherein the transmitter portion of the wireless transceiver is disabled based on one or more of the confirmation from the user or a failure of the user to indicate a denial of the disabling of the transmitter portion of the wireless transceiver within a predetermined denial period.

14. A system comprising:
an electronic device; and
a wireless communication device that includes:
a memory unit;
a wireless transceiver configured to transmit and receive wireless signals; and
logic configured to:
wirelessly receive a disabling message from the electronic device when the wireless communication device is within a threshold proximity of the electronic device, the disabling message indicating disabling of wireless transmission for a predetermined time period, wherein the disabling message is received on a periodic basis that corresponds to the predetermined time period, and
disable a transmitter portion of the wireless transceiver based on the disabling message.

15. The system of claim 14, wherein, based on the disabling message, the transmitter portion of the wireless transceiver is disabled while a receiver portion of the wireless transceiver remains enabled.

* * * * *